(12) United States Patent
Chun

(10) Patent No.: US 6,882,935 B2
(45) Date of Patent: Apr. 19, 2005

(54) METHOD AND APPARATUS FOR COMMUNICATING MAP DATA FOR VEHICLE NAVIGATION

(75) Inventor: Jin-Min Chun, Suwon (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 10/656,912

(22) Filed: Sep. 4, 2003

(65) Prior Publication Data

US 2004/0128068 A1 Jul. 1, 2004

(30) Foreign Application Priority Data

Sep. 5, 2002 (KR) .................................. 10-2002-0053522

(51) Int. Cl.$^7$ ............................................. G01C 21/32
(52) U.S. Cl. ..................... 701/208; 701/207; 701/209; 340/990; 340/995.1
(58) Field of Search ................................. 701/200–213; 382/232, 233, 245, 246, 173, 305; 340/990, 995.1, 995.14, 995.18; 707/100, 101, 102, 104.1

(56) References Cited

U.S. PATENT DOCUMENTS

| | | | | |
|---|---|---|---|---|
| 6,038,559 A | * | 3/2000 | Ashby et al. | ................... 707/4 |
| 6,163,749 A | * | 12/2000 | McDonough et al. | ........ 701/208 |
| 6,184,823 B1 | * | 2/2001 | Smith et al. | ........... 342/357.13 |
| 6,393,149 B1 | * | 5/2002 | Friederich et al. | .......... 382/173 |
| 6,600,841 B1 | * | 7/2003 | Friederich et al. | .......... 382/305 |
| 6,650,326 B1 | * | 11/2003 | Huber et al. | ................. 345/428 |
| 6,768,818 B1 | * | 7/2004 | Friederich et al. | .......... 382/233 |

FOREIGN PATENT DOCUMENTS

| | | |
|---|---|---|
| JP | 2002-226267 | 7/2001 |
| KR | 1020010087397 | 9/2001 |

* cited by examiner

*Primary Examiner*—Richard M. Camby
(74) *Attorney, Agent, or Firm*—Morgan Lewis & Bockius LLP

(57) ABSTRACT

A map data transmitting server, interconnected with a vehicle terminal through a wireless network, stores map data including a plurality of cell layers in which cells are linearly aligned, each cell of the cell layer bordering two adjacent cells of another cell layer that is adjacent to the cell layer, and the vehicle terminal selectively requests transmission of needed cell data to the server and accordingly receives the requested data from the server.

10 Claims, 3 Drawing Sheets

Vehicle route

METHOD AND APPARATUS FOR COMMUNICATING MAP DATA FOR VEHICLE NAVIGATION

CROSS-REFERENCE TO RELATED APPLICATIONS

This application claims priority of Korean Application No. 10-2002-0053522, filed on Sep. 5, 2002, the disclosure of which is incorporated fully herein by reference.

FIELD OF THE INVENTION

The present invention relates to a method and apparatus for communicating map data for vehicle navigation, and more particularly, to a method and apparatus for a navigation system to communicate map data with a server.

BACKGROUND OF THE INVENTION

Recently, navigation systems for displaying a current vehicle position on a map have been widely adopted in vehicles. Such navigation systems require map data. The map data for navigation systems are usually recorded in a data storage unit, for example, a CD-ROM or DVD included in the navigation system, such that regional map data are retrieved from the data storage unit.

Another scheme for obtaining regional map data of a current vehicle position is to receive the regional map data from a separate map-server for transmitting such map data through a network, which is enabled by communication technology.

In the latter scheme, the entire map stored in the map-server is divided into a multitude of cells, and the navigation system of a vehicle partially downloads, from the map-server, data from cells (referred to as "cell data" hereinafter) that are adjacent to a cell in which the vehicle is currently positioned.

In general, in conventional systems, with map data divided into an orthogonal grid, when the vehicle position lies in any given cell, there are eight adjacent cells about which map data must be transmitted. Conventionally, the amount of data may be reduced by transmitting map data for cells lying along an expected trajectory of the vehicle. This may reduce the number of cells about which data must be transmitted to about five. However, transmission of map data through a wireless network still requires a substantial amount of communication time and load. Therefore, it is preferable that the amount of data required to be transmitted is reduced to a minimum.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiment of the present invention provide methods and apparatus for communicating map data for vehicle navigation in which efficiency of map data communication is improved. An exemplary system for communicating map data for vehicle navigation according to one embodiment of the present invention includes a vehicle terminal and a map data transmitting server. The server is interconnected with the vehicle terminal through a wireless network for storing map data for vehicle navigation comprising a plurality of cell data, and for transmitting cell data through the wireless network to the vehicle terminal when requested by the vehicle terminal.

The map data transmitting server includes a network interface for transmitting data through the wireless network, a data storage unit for storing the map data for vehicle navigation, and a processing unit for extracting cell data of cells from the map data and for transmitting the extracted cell data through the wireless network when requested from the vehicle terminal.

The map data stored in the data storage unit includes a plurality of cell layers in which cells are linearly aligned, and each cell of a cell layer borders two adjacent cells of another cell layer that is adjacent to the cell layer.

In a further embodiment, each cell of the map is square.

In another further embodiment, each cell of the cell layer borders the two adjacent cells of the other cell layer that is adjacent to the cell layer by the same amount.

An exemplary method for communicating map data for vehicle navigation that is useful with the present invention utilizes the exemplary system.

In the above system, the vehicle terminal determines a current position cell including a current position of a vehicle, and requests, to the map data transmitting server, transmission of cell data of one or more cells that are adjacent to the current position cell.

The map data transmitting server accordingly retrieves the requested cell data and transmits the same to the vehicle terminal. Accordingly the vehicle terminal receives the cell data transmitted from the server correspondingly to the request.

In a further embodiment, the vehicle terminal calculates a proceeding direction of the vehicle on the map data, wherein said one or more cells are positioned in the proceeding direction from the current position cell.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
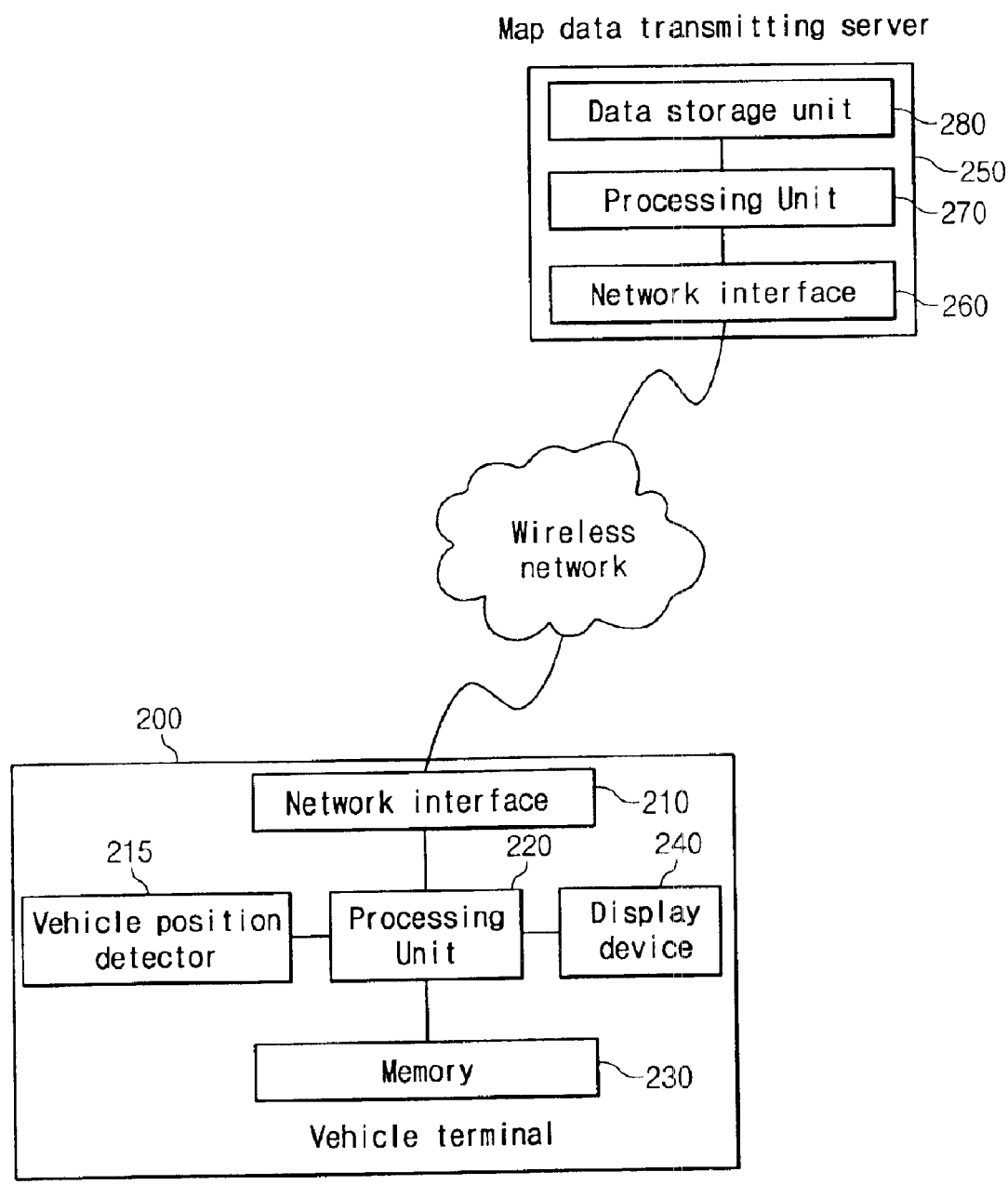
FIG. 1 is a block diagram of a system for communicating map data for vehicle navigation according to a preferred embodiment of the present invention.

As shown in FIG. 1, a system for communicating map data for vehicle navigation according to a preferred embodiment of the present invention includes a vehicle terminal 200, and a map data transmitting server 250 interconnected with the vehicle terminal 200 through a wireless network.

The wireless network may be realized according to any kind of wireless communication network scheme, such as wireless Internet.

The vehicle terminal 200 includes a network interface 210 for communicating data through the wireless network, a processing unit 220 for processing map data received through the network interface 210, and a memory 230 for storing the received map data.

Terminal 200 further includes a vehicle position detector 215 for detecting a current position of a vehicle, and a display device 240 for displaying the received map data. The vehicle position detector 215 may be realized as a receiver for receiving vehicle position data from a GPS (Global Positioning System) satellite. It is obvious that a proceeding direction of a vehicle can be determined based on consecutive vehicle position data.

The processing unit 220 can be realized by one or more processors activated by predetermined software, and the predetermined software can be programmed by a person of ordinary skill in the art to perform each step of a method for communicating map data that must be executed in the vehicle terminal 200, according to a preferred embodiment of this invention as described herein.

The map data transmitting server 250 includes a network interface 260 for transmitting data through the wireless network; a data storage unit 280 for storing the map data for vehicle navigation, the map data including a plurality of cell data; and a processing unit 270 for extracting cell data of cells from the map data and for transmitting the extracted cell data through the wireless network when requested from the vehicle terminal 200.

The processing unit 270 also can be realized by one or more processors activated by predetermined software, and the predetermined software can be programmed by a person of ordinary skill in the art to perform each step of a method for communicating map data that must be executed, in the map data transmitting server 250, according to a preferred embodiment of this invention as described herein.

Figure 3:
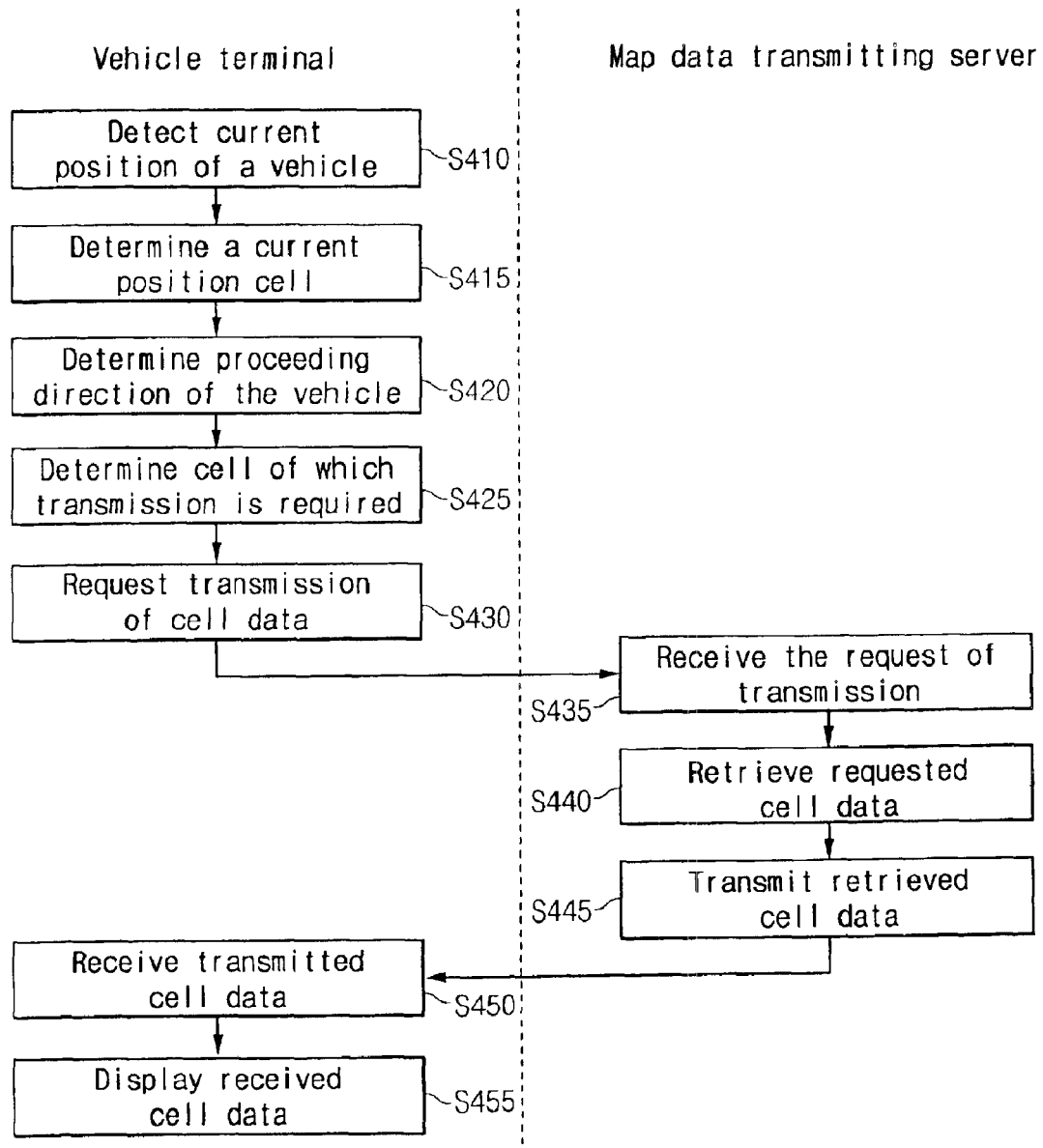
FIG. 3 is a flowchart for showing a method for communicating map data for vehicle navigation according to a preferred embodiment of the present invention.

As shown in FIG. 3, according to a preferred embodiment of the present invention, each group of cells is linearly aligned to form a cell layer in which each cell of the map is square, and each cell of the cell layer borders two adjacent cells of another cell layer that is adjacent to the cell layer by the same amount. For example, four cells 1-1, 1-2, 1-3, and 1-4 form a first cell layer, four cells 2-1, 2-2, 2-3, and 2-4 form a second cell layer, four cells 3-1, 3-2, 3-3, and 3-4 form a third cell layer, and four cells 4-1, 4-2, 4-3, and 4-4 form a fourth cell layer.

A cell (e.g. cell 3-3) of a cell layer (e.g. the third cell layer) borders two adjacent cells (e.g. cells 2-3 and 2-4) of another cell layer (e.g. the second cell layer) that is adjacent to the cell layer (e.g. the third cell layer).

Due to the structure of the map data, the amount of data that has to be communicated between the vehicle terminal 200 and the map data transmitting server 250 through the wireless network is reduced. For example, according to a preferred embodiment, the current position cell is surrounded by only six cells. Furthermore, when a proceeding direction of a vehicle is considered, for example when the vehicle is proceeding upward in FIG. 2, the memory 230 stores only three cells, that is, cells 2-3, 3-2, and 4-3.

A method for communicating map data for vehicle navigation utilizing the map data transmitting server 250 storing map data of the above described structure is described in detail with reference with FIG. 3.

As shown in FIG. 3, according to a method for communicating map data in a preferred embodiment of the present invention, the vehicle terminal 200 firstly detects a current position of a vehicle using the vehicle position detector 215 at step S410, and subsequently determines a current position cell of the vehicle including the current position from cells stored in the memory 230 at step S415.

The vehicle terminal then calculates a proceeding direction of the vehicle on the map data based on consecutive vehicle positions at step S420.

Subsequently at step S425, the vehicle terminal 200 determines cells of which cell data is required, on the basis of the detected vehicle position, and, more preferably, the calculated proceeding direction of the vehicle.

The required cells may be arbitrarily determined by a person in the art. However, it is preferable that the required cells are determined as cells positioned in the proceeding direction from the current position cell, of which cell data have not yet been received.

Figure 2:
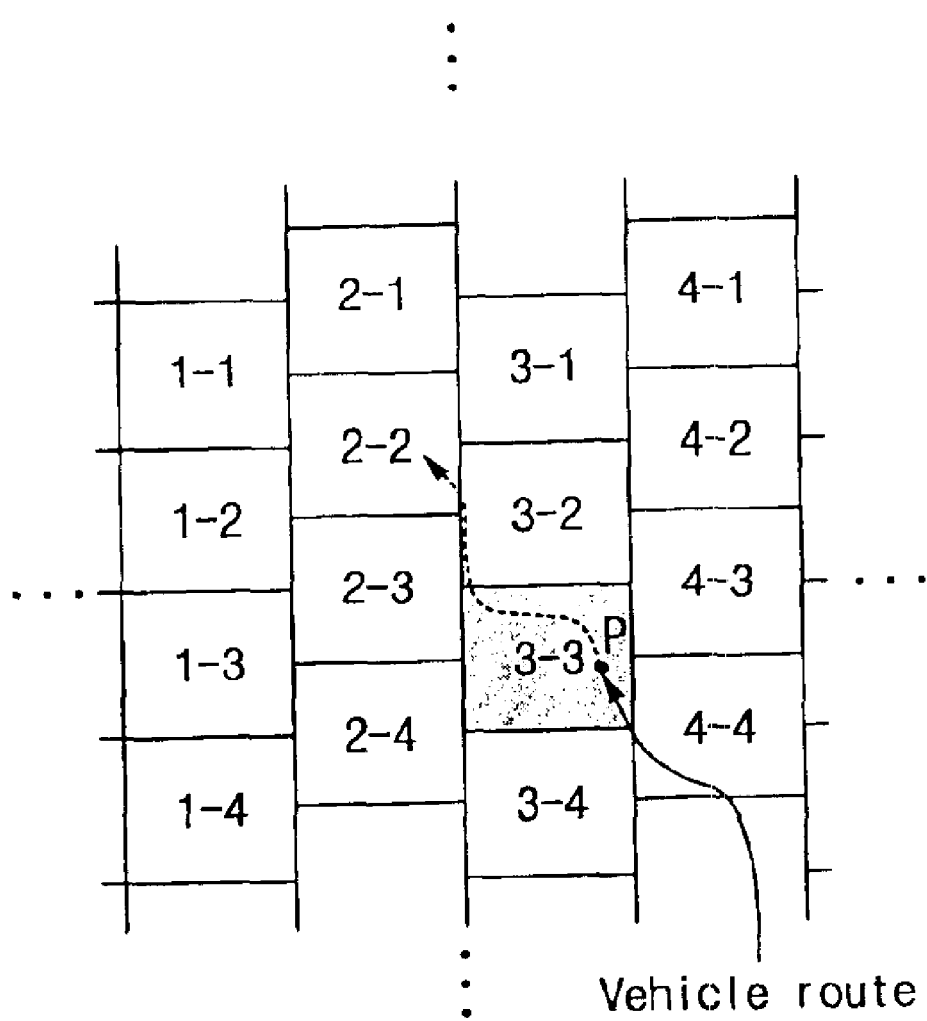
FIG. 2 illustrates a structure of map data according to a preferred embodiment of the present invention.

According to the preferable criteria for determining required cells, for example, when the vehicle following a route shown in FIG. 2 is currently positioned at point P of cell 3-3, cells of which cell data is required are determined as cells 2-3 and 3-2, because cell data of a cell 4-3 must have already been received at the time when the vehicle passed through a cell 4-4.

When cells of which cell data is required are determined at step S425, the vehicle terminal 200 transmits signals for requesting cell data of the required cells to the map data transmitting server 250 through the wireless network, at step S430.

The map data transmitting server 250 receives the request signal at step S435, and accordingly, retrieves the requested cell data from the data storage unit 280 at step S440, and transmits the retrieved cell data to the vehicle terminal at step S445.

The vehicle terminal 200 receives the transmitted cell data at step S450, and displays the received cell data at the display device 240 at step S455 when needed, according to the vehicle route.

Whether the received cell data is displayed or not may be determined arbitrarily according to a person in the art, and it may be that the received cell data is displayed when the current position of the vehicle enters the cell.

Data traffic loads of the prior art using cells in a check pattern and a preferred embodiment using the above described structure of cells are compared in the following table.

| | | Required number of cells of transmission | | Data traffic load compared |
|---|---|---|---|---|
| | | Prior art | Embodiment | with the prior art |
| Vehicle direction not considered | Initially | 8 | 6 | −25% |
| | During navigation | 3 or 5 | 3 | −40% |
| Vehicle direction Considered | Initially | 5 | 3 | −40% |
| | During navigation | 4 | 2 | −50% |

"Vehicle direction not considered" denotes a case in which all the cells around the current position cells are transmitted without considering the vehicle route.

In this case, the vehicle terminal for the navigation system must initially receive cell data of all the six cells (eight cells according to the prior art) around the current position cell. However, the number of cells of which cell data must be received is only three (five according to the prior art) at the time when the current position cell is changed during navigation.

"Vehicle direction considered" denotes a case in which only the cells in the proceeding direction of the vehicle from the current position cells are transmitted.

In this case, the vehicle terminal for the navigation system must initially receive cell data of all three cells (three or five cells according to the prior art) in the proceeding direction of the vehicle from the current position cell. However, the number of cells of which cell data must be received is only two (four according to the prior art) at the time when the current position cell is changed during navigation.

As shown above, according to a preferred embodiment of the present invention, the amount of cell data that has to be transmitted according to vehicle position change is reduced because the entire map is divided by cells that are more effectively aligned.

This also reduces traffic load of a wireless network and accordingly reduces cost for the transaction.

Furthermore, data processing efficiency of map data and accordingly response speed of a navigation system is increased because time for data communication is substantially reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A system for communicating map data for vehicle navigation comprising:
   a vehicle terminal; and
   a map data transmitting server, interconnected with the vehicle terminal through a wireless network, for storing map data for vehicle navigation comprising a plurality of cell data, and for transmitting cell data through the wireless network to the vehicle terminal when requested by the vehicle terminal,
   wherein the map comprises a plurality of cell layers in which cells are linearly aligned, the cells of adjacent layers being offset with respect to each other, and each cell of a cell layer borders two adjacent cells of another cell layer that is adjacent to the cell layer.

2. The system of claim 1, wherein each cell of the map is square.

3. The system of claim 1, wherein each cell of the cell layer borders the two adjacent cells of the other cell layer that is adjacent to the cell layer by the same amount.

4. A method for communicating map data for vehicle navigation utilizing a server for transmitting the map data through a wireless network, said map comprising a plurality of cells, the method comprising:
   determining a current position cell including a current position of a vehicle;
   requesting transmission of cell data of one or more cells that are adjacent to the current position cell; and
   receiving cell data transmitted from the server correspondingly to the request, wherein the map comprises a plurality of cell layers in which cells are linearly aligned, the cells of adjacent layers being offset with respect to each other, and each cell of the cell layer borders two adjacent cells of another cell layer that is adjacent to the cell layer.

5. The method of claim 4, wherein each cell of the map is square.

6. The method of claim 4, wherein each cell of the cell layer borders the two adjacent cells of the other cell layer that is adjacent to the cell layer by the same amount.

7. The method of claim 4, further comprising calculating a proceeding direction of the vehicle on the map data, wherein said one or more cells are positioned in the proceeding direction from the current position cell.

8. A server for transmitting map data for vehicle navigation, the server being connected with a vehicle terminal through a wireless network and comprising:
   a network interface for transmitting data through the wireless network;
   a data storage unit for storing the map data for vehicle navigation; and
   a processing unit for extracting cell data of cells from the map data and for transmitting the extracted cell data through the wireless network when requested from the vehicle terminal,
   wherein the map data stored in the data storage unit comprises a plurality of cell layers in which cells are linearly aligned, the cells of adjacent layers being offset with respect to each other, and each cell of the cell layer borders two adjacent cells of another cell layer that is adjacent to the cell layer.

9. The server of claim 8, wherein each cell of the map is square.

10. The server of claim 8, wherein each cell of the cell layer borders the two adjacent cells of the other cell layer that is adjacent to the cell layer by the same amount.

* * * * *